US011239533B2

(12) United States Patent
Zeng et al.

(10) Patent No.: US 11,239,533 B2
(45) Date of Patent: Feb. 1, 2022

(54) BATTERY CONNECTION MODULE

(71) Applicant: Molex, LLC, Lisle, IL (US)

(72) Inventors: Shang Xiu Zeng, Chengdu (CN); Kian Heng Lim, Singapore (SG)

(73) Assignee: Molex, LLC, Lisle, IL (US)

( * ) Notice: Subject to any disclaimer, the term of this patent is extended or adjusted under 35 U.S.C. 154(b) by 220 days.

(21) Appl. No.: 16/042,231

(22) Filed: Jul. 23, 2018

(65) Prior Publication Data
US 2019/0027731 A1  Jan. 24, 2019

(30) Foreign Application Priority Data
Jul. 24, 2017  (CN) .......................... 201710606382.6

(51) Int. Cl.
*H01M 50/54* (2021.01)
*H01M 50/502* (2021.01)
(Continued)

(52) U.S. Cl.
CPC ......... *H01M 50/54* (2021.01); *H01M 10/425* (2013.01); *H01M 50/20* (2021.01);
(Continued)

(58) Field of Classification Search
CPC ...... H01M 2/204; H01M 2/206; H01M 2/266; H01M 50/20; H01M 50/502; H01M 50/54; H01M 50/543; H01M 10/425
See application file for complete search history.

(56) References Cited

U.S. PATENT DOCUMENTS

| 8,777,668 | B2 | 7/2014 | Ikeda et al. |
| 9,425,520 | B2 | 8/2016 | Kinoshita et al. |
| 2012/0231638 | A1* | 9/2012 | Ikeda ................... H01M 2/206 439/77 |

(Continued)

FOREIGN PATENT DOCUMENTS

| CN | 2452174 Y | 10/2001 |
| CN | 103210522 A | 7/2013 |

(Continued)

OTHER PUBLICATIONS

Office Action received for Japanese Patent Application No. 2018-126988, dated Jul. 23, 2019, 10 pages. (5 pages of English Translation and 5 pages of Official Copy).

(Continued)

*Primary Examiner* — Sarah A. Slifka
*Assistant Examiner* — Lilia Nedialkova

(57) ABSTRACT

A battery connection module includes an electrode connection tray and a flexible circuit board. The connection tray includes a carrying tray and a plurality of busbars. The busbars are mounted on the carrying tray. The board is configured on the connection tray, and the busbars are arranged adjacent to the board. The board includes a main body and a plurality of L-shaped flexible arms extending therefrom. Each L-shaped flexible arm is configured to be movably connected with a respective one of the busbars. Each L-shaped flexible arm includes a first section, a second section and an end portion. The first section extends outwardly from the main body toward the busbars. The second section connects with the first section and extends in a direction between the busbars and the main body. The end portion is positioned at a distal end of the second section and connects with the corresponding busbar.

9 Claims, 9 Drawing Sheets

(51) Int. Cl.
_H01M 10/42_ (2006.01)
_H01M 50/20_ (2021.01)
_H01M 50/543_ (2021.01)

(52) U.S. Cl.
CPC ....... _H01M 50/502_ (2021.01); _H01M 50/543_ (2021.01); _H01M 2220/20_ (2013.01)

(56) References Cited

U.S. PATENT DOCUMENTS

| | | | | |
|---|---|---|---|---|
| 2015/0171401 | A1* | 6/2015 | Kim | ............... H01M 2/204 429/158 |
| 2018/0277969 | A1* | 9/2018 | Yaita | ............... H01R 13/447 |
| 2019/0109423 | A1* | 4/2019 | Shimoda | ............... H01G 2/04 |

FOREIGN PATENT DOCUMENTS

| | | |
|---|---|---|
| JP | H01-135758 U | 9/1989 |
| JP | H11-191662 A | 7/1999 |
| JP | 2013-157125 A | 8/2013 |
| JP | 2014-220148 A | 11/2014 |
| JP | 3195110 U | 12/2014 |
| JP | 2015-022965 A | 2/2015 |
| JP | 2015-099759 A | 5/2015 |
| JP | 2015-138604 A | 7/2015 |
| JP | 2017-033646 A | 2/2017 |
| KR | 101698765 B1 | 1/2017 |
| KR | 10-2017-0002183 U | 6/2017 |
| WO | WO-2017187996 A1 * | 11/2017 ............ H01M 2/206 |

OTHER PUBLICATIONS

Office action received for Korean patent application No. 10-2018-0083773, dated Sep. 10, 2019, 18 pages. (10 pages of English translation and 8 pages of official copy).

Decision to Grant received for Korean patent application No. 10-2018-0083773, dated May 26, 2020, 2 pages. (1 page of English translation and 1 page of official copy).

\* cited by examiner

BATTERY CONNECTION MODULE

RELATED APPLICATIONS

This application claims priority to Chinese Application No. 201710606382.6, filed Jul. 24, 2017, which is incorporated herein by reference in its entirety.

TECHNICAL FIELD

The present disclosure relates to a battery connection module, and particularly relates to a battery connection module with a flexible circuit board.

BACKGROUND ART

The existing battery connection module has always had a problem that when the battery connected with the busbar is displaced due to expansion, contraction or vibration, the structure connected with the busbar cannot be fully adjusted in response to such displacement. For example, the branch section disclosed in U.S. Pat. No. 8,777,668 B2 only can be deformed in response to a displacement of the straight section in the longitudinal direction, but cannot be deformed in response to a displacement of the straight section in the transverse direction perpendicular to the straight section, which thus may damage the connection between the branch section and the busbar (such as a welding portion), or damage the wiring member, therefore it is still insufficient in application.

In addition, the existing battery connection module still has a problem that when the busbar is assembled, it needs to forcibly press the busbar to pass through the projection used to fix the busbar, so which may damage the projection, reduce or lose retaining for the busbar.

Therefore, there is a need for an improved battery connection module to solve the above problems.

The description in background as above merely is used to provide a background art, and it does not admit that the description in the background as above discloses the object of the present disclosure, and do not constitute a prior art of the present disclosure, and any description in the background as above shall not be acted as any part of the present disclosure.

SUMMARY

According to an embodiment of the present disclosure, a battery connection module comprises an electrode connection tray and a flexible circuit board. The electrode connection tray comprises: a carrying tray; and a plurality of busbars configured to be mounted on the carrying tray. The flexible circuit board is configured on the electrode connection tray, and the plurality of busbars are arranged adjacent to the flexible circuit board. The flexible circuit board comprises a main body and a plurality of L-shaped flexible arms extending from the main body. The plurality of L-shaped flexible arms are configured to respectively be movably connected with the plurality of busbars. The L-shaped flexible arm comprises: a first section which extends outwardly from the main body toward the plurality of busbars; a second section which connects with the first section and extends in a direction between the plurality of busbars and the main body; and an end portion which is positioned at a distal end of the second section and connects with the corresponding busbar.

In an embodiment, the electrode connection tray further comprises a plurality of busbar receiving grooves and a flexible arm receiving groove. The plurality of busbar receiving grooves respectively receive the plurality of busbars. The busbar receiving groove comprises: an inner frame portion adjacent to the flexible circuit board; an outer frame portion opposite to the inner frame portion; and two side frame portions respectively connecting both ends of the inner frame portion and the outer frame portion. The flexible arm receiving groove is provided to the inner frame portion and configured to receive the end portion of the L-shaped flexible arm, a space of the flexible arm receiving groove is slightly larger than the end portion so as to provide a clearance for displacement of the end portion.

In an embodiment, the flexible circuit board comprises a plurality of conductive plates, and the end portion of the L-shaped flexible arm is connected with the busbar via the conductive plate.

Another embodiment of the present disclosure, a battery connection module comprises an electrode connection tray and a flexible circuit board. The electrode connection tray comprises a plurality of busbars and a carrying tray. The carrying tray comprises a plurality of busbar receiving grooves respectively receiving the plurality of busbars. The busbar receiving groove comprises: an inner frame portion; an outer frame portion opposite to the inner frame portion; two side frame portions respectively connecting both ends of the inner frame portion and the outer frame portion; a bottom supporting bar provided to a bottom of the busbar receiving groove and configured to support the busbar; and an upper position-limiting protrusion provided to an inner wall of the outer frame portion and positioned above the busbar, the inner frame portion, the outer frame portion and the two side frame portions enclose to form a periphery of the busbar receiving groove. The flexible circuit board is configured on the carrying tray, the plurality of busbar receiving grooves are arranged adjacent to the flexible circuit board, the inner frame portion of each busbar receiving groove is adjacent to the flexible circuit board, the flexible circuit board comprises a plurality of position-limiting plates, the position-limiting plate is provided to the inner frame portion, and the position-limiting plate protrudes into the busbar receiving groove and is positioned above the busbar.

In an embodiment, the two side frame portions of the busbar receiving groove are not provided with an upper position-limiting configuration for the busbar.

In an embodiment, the plurality of busbars comprise a plurality of buffer bending portions, the plurality of buffer bending portions are configured to respectively be supported by the plurality of bottom supporting bars, the upper position-limiting protrusion is positioned above one corresponding buffer bending portion, and the position-limiting plate is positioned above one corresponding buffer bending portion.

In an embodiment, a position-limiting plate receiving groove is provided on the inner frame portion of the busbar receiving groove and configured to receive the position-limiting plate, the position-limiting plate comprises: a base portion receiving in the position-limiting plate receiving groove; and a protruding portion protruding into the busbar receiving groove and positioned above the corresponding buffer bending portion of the busbar.

In an embodiment, the base portion of the position-limiting plate has a hole, a position-limiting plate mounting post is provided in the position-limiting plate receiving groove, and the position-limiting plate mounting post is configured to pass through the hole on the position-limiting plate to fix the position-limiting plate.

According to still another embodiment of the present disclosure, a battery connection module comprises an electrode connection tray and a flexible circuit board. The electrode connection tray comprises a plurality of busbars and a carrying tray. The carrying tray comprises a plurality of busbar receiving grooves respectively receiving the plurality of busbars. The busbar receiving groove comprises: an inner frame portion; an outer frame portion opposite to the inner frame portion; two side frame portions respectively connecting both ends of the inner frame portion and the outer frame portion; a bottom supporting bar provided to a bottom of the busbar receiving groove and configured to support the busbar; and an upper position-limiting protrusion provided to an inner wall of the outer frame portion and positioned above the busbar, the inner frame portion, the outer frame portion and the two side frame portions enclose to form a periphery of the busbar receiving groove. The flexible circuit board is configured on the electrode connection tray, the plurality of busbar receiving grooves are arranged adjacent to the flexible circuit board, the inner frame portion of each busbar receiving groove is adjacent to the flexible circuit board. The flexible circuit board comprises: a plurality of position-limiting plates, the position-limiting plate is provided to the inner frame portion, and the position-limiting plate protrudes into the busbar receiving groove and is positioned above the busbar; a main body; and a plurality of L-shaped flexible arms extending from the main body. The plurality of L-shaped flexible arms are configured to respectively be movably connected with the plurality of busbars, the L-shaped flexible arm comprising: a first section which extends outwardly from the main body toward the plurality of busbars; a second section which connects with the first section and extends in a direction between the plurality of busbars and the main body; and an end portion which is positioned at a distal end of the second section and connects with the corresponding busbar.

In an embodiment, the inner frame portion of the busbar receiving groove is provided with a flexible arm receiving groove and a position-limiting plate receiving groove; the flexible arm receiving groove is configured to receive the end portion of the L-shaped flexible arm; a space of the flexible arm receiving groove is slightly larger than the end portion to provide a clearance for displacement of the end portion; and the position-limiting plate receiving groove is configured to receive the position-limiting plate.

In an embodiment, the plurality of busbars comprise a plurality of buffer bending portions, the plurality of buffer bending portions are configured to respectively be supported by the plurality of bottom supporting bars, the upper position-limiting protrusion is positioned above one corresponding buffer bending portion, and the position-limiting plate is positioned above one corresponding buffer bending portion.

In an embodiment, the base portion of the position-limiting plate has a hole, a position-limiting plate mounting post is provided in the position-limiting plate receiving groove, and the position-limiting plate mounting post is configured to pass through the hole on the position-limiting plate to fix the position-limiting plate.

In an embodiment, the flexible circuit board comprises a plurality of conductive plates, and the end portion of the L-shaped flexible arm is connected with the busbar via the conductive plate.

In an embodiment, the carrying tray comprises: a frame, the frame comprises a plurality of outer latching blocks, the plurality of outer latching blocks are provided to an outer side of the frame; and a plurality of spacing bars, which spaces apart the busbar receiving grooves from each other and comprises a plurality of channels and a plurality of inner latching blocks, the plurality of inner latching blocks are respectively provided in the plurality of channels. And the battery connection module comprises an upper cover, the upper cover comprises: a plurality of inner latching members, the plurality of inner latching members are provided to a middle of a bottom of the upper cover and configured to respectively latch with the plurality of inner latching blocks; and a plurality of outer latching members, the plurality of outer latching members are provided to a periphery of the upper cover and configured to respectively latch with the plurality of outer latching blocks.

In an embodiment, the flexible circuit board further comprises a connector, the electrode connection tray further comprises a connector receiving box, the connector is mounted in the connector receiving box.

In an embodiment, the connector receiving box comprises a side wall, the side wall comprises a plurality of latching holes, the upper cover comprises an extending portion and a plurality of outer latching pieces, the plurality of outer latching pieces are provided to the extending portion and configured to respectively latch with the plurality of latching holes, the extending portion is configured to cover the connector receiving box.

In an embodiment, the busbars comprises two output busbars, each output busbar has an electrode leading-out leg, the electrode leading-out leg comprises a vertical portion, the upper cover comprises a cover plate, the cover plate is configured to cover the vertical portion.

In an embodiment, the electrode connection tray further comprises an electrode adapter plate, the electrode adapter plate connects one output busbar and the electrode leading-out leg of the one output busbar, so as to make the two electrode leading-out legs positioned at the same side of the carrying tray.

In the background art, when the battery under the busbar is displaced due to expansion, contraction or vibration, the existing strip-shaped flexible arm can only be deformed in the two-dimensional direction in response to the displacement of the busbar in the single direction. Relatively, the L-shaped flexible arm of the present disclosure adopts a L-shaped design, which can be deformed in directions respectively parallel to and perpendicular to the busbar, and cooperates with the clearance in the flexible arm receiving grooves, the L-shaped flexible arm of the present disclose can be deformed in the three dimensional direction in response to the displacement of the busbar; the L-shaped flexible arm of the present disclosure is more able to ensure the mechanical and electrical connection between the flexible circuit board and each busbar and prevent the flexible circuit board from being damaged.

In addition, Because the side frame portion of the present disclosure is not provided with an upper position-limiting configuration for the busbar, the bottom supporting bars, the position-limiting plate and the upper position-limiting protrusion(s) toward the position-limiting plate cooperate and can limit the busbar in the busbar receiving groove but have a space for displacement of the busbar in a floating manner, which does not need complex structure. So it is simple and easy to mount the busbar on the carrying tray.

Technical features and advantages of the present disclosure are widely summarized as above, so as to better understand the following detailed description. Other technical features making up the object of the claims of the present disclosure and other advantages will be described below. A person skilled in the art of the present disclosure shall understand that the concept and specific embodiments disclosed below may be easily used to modify or design other configuration or manufacturing approach so as to realize the same object as the present disclosure. A person skilled in the art of the present disclosure shall also understand that, such an equivalent configuration or approach cannot be departed from the spirit and scope of the present disclosure defined by the appended claims.

BRIEF DESCRIPTION OF THE DRAWINGS

The various respects of the present disclosure may be best understood by the following detailed description taken in connection with the accompanying figures. It should be noted that, according to a standard implementing mode of the industries, features are not drawn as the scale. In practice, for the sake of clear explanation, various features may be arbitrarily enlarged or reduced in dimension.

DETAILED DESCRIPTION OF THE PREFERRED EMBODIMENTS

The following disclosed content provides various embodiments or examples used to implement various features of the present disclosure. Specific examples of elements and arrangements are described as follows, so as to simplify the disclosed content of the present disclosure. Certainly, these are merely examples, and are not used to limit the present disclosure. For example, in the following description, that a first feature is formed on or above a second feature may comprise an embodiment that the first feature and the second feature are formed to directly contact each other, may also comprise an embodiment that other feature is formed between the first feature and the second feature, therefore the first feature and the second feature do not directly contact each other. Moreover, the present disclosure may allow a symbol and/or a character of an element to be repeated in different examples. The repetition is used for simplification and clearness, but is not used to dominate a relationship between various embodiments and/or discussed structures.

Moreover, the present disclosure may use spatial corresponding terminologies, such as "below", "lower than", "relative lower", "higher than", "relative high" and the like, so as to describe a relationship between an elements or feature and another element or feature. Spatial corresponding terminologies are used to comprise various orientations of a device in use or operation besides orientations illustrated in figures. The device may be orientated (rotated by 90 degrees or at other orientation), and the corresponding spatial description in the present disclosure may be correspondingly explained. It should be understood that, when a feature is formed to another feature or above a substrate, other feature may be presented between them.

Figure 1:
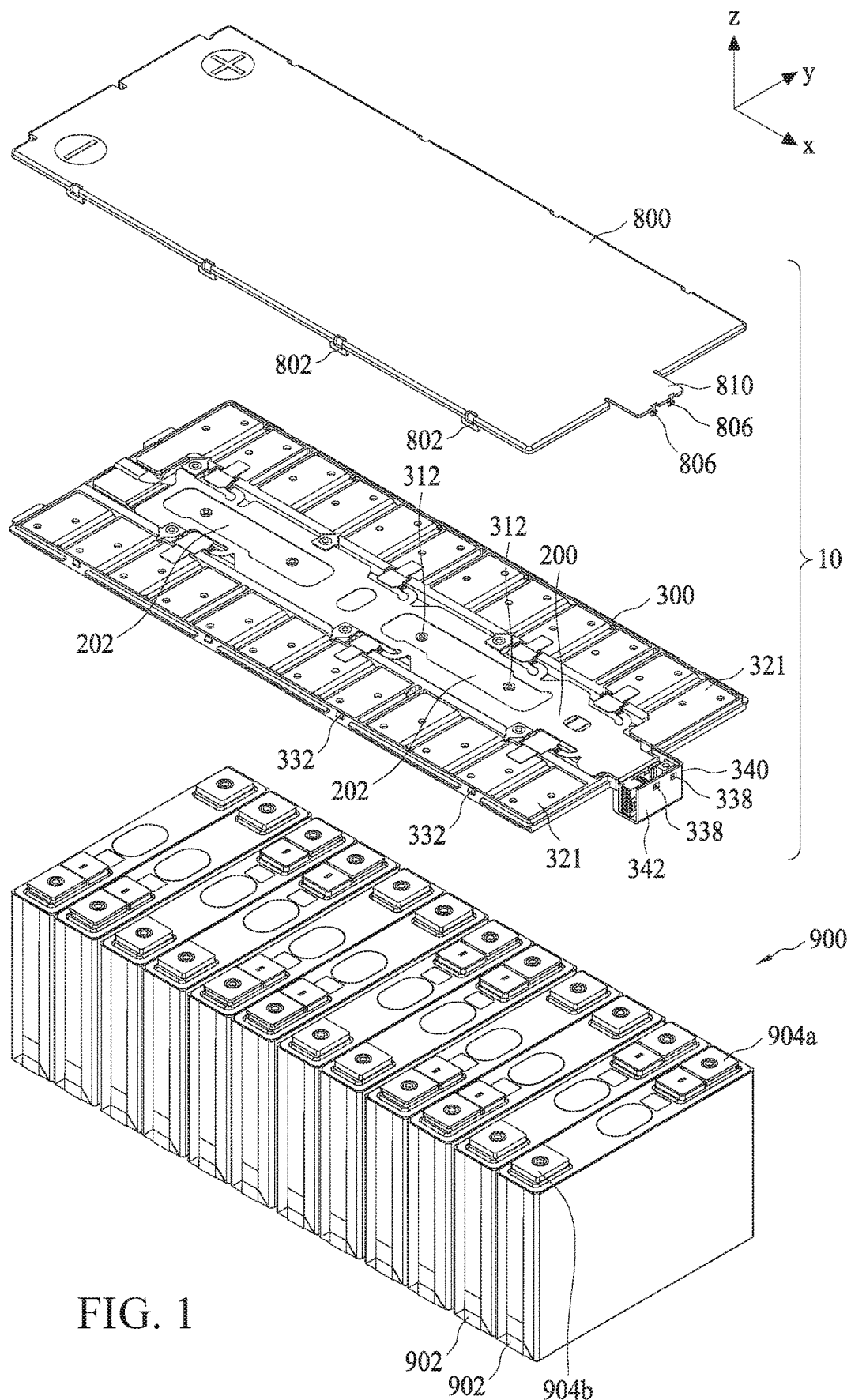
FIG. 1 is a perspective view of a battery connection module and a battery pack of an embodiment of the present disclosure.

FIG. 1 is a perspective view of a battery connection module 10 and a battery pack 900 of an embodiment of the present disclosure. The battery connection module 10 is configured to connect the battery pack 900, the battery pack 900 comprises a plurality of batteries 902. The battery connection module 10 comprises an upper cover 800, a flexible circuit board 200 and an electrode connection tray 300, the assembling of which will be further described below.

Figure 2:
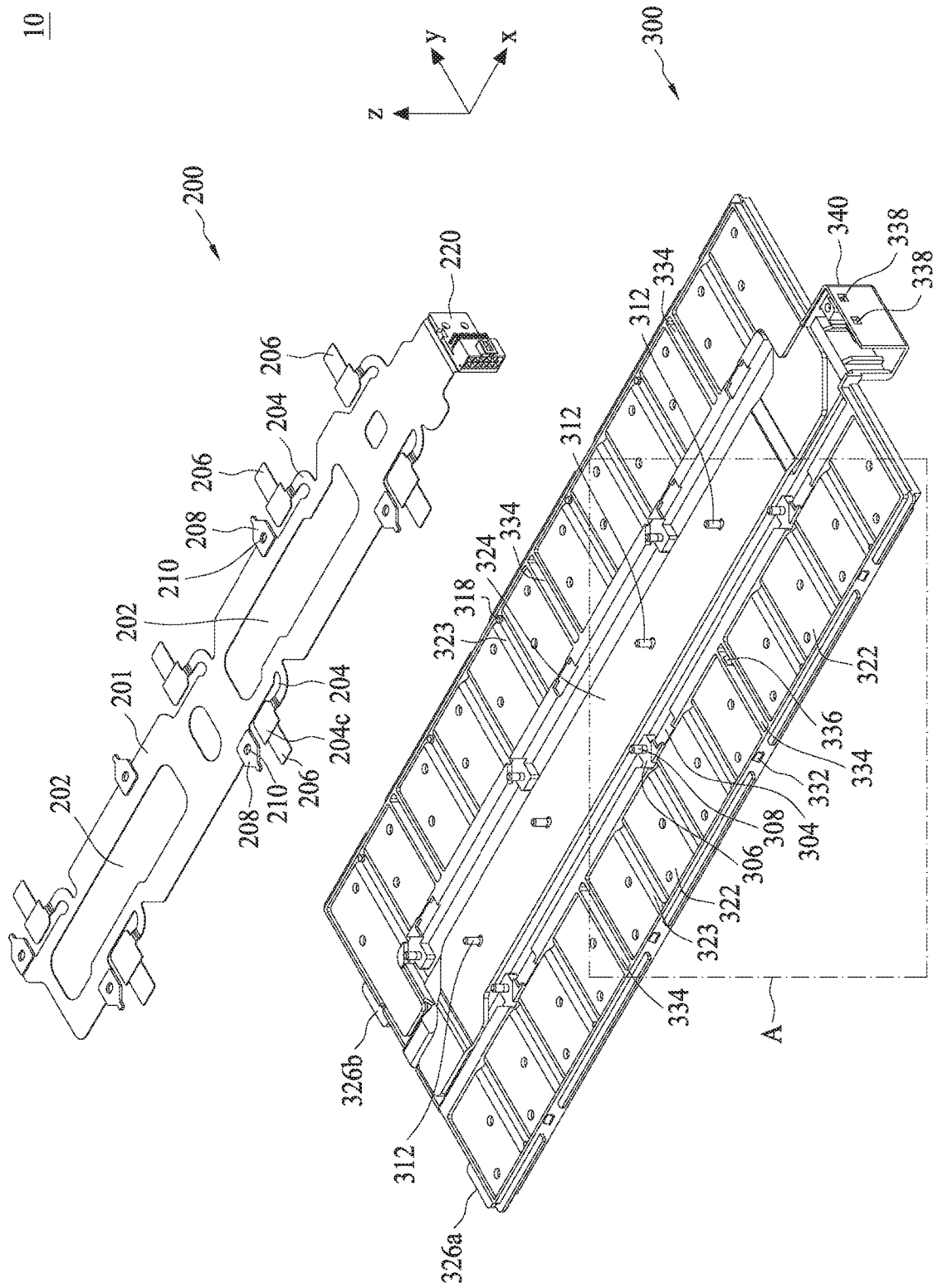
FIG. 2 is a perspective exploded view of a flexible circuit board and an electrode connection tray of the battery connection module of the embodiment of the present disclosure.
Figure 3:
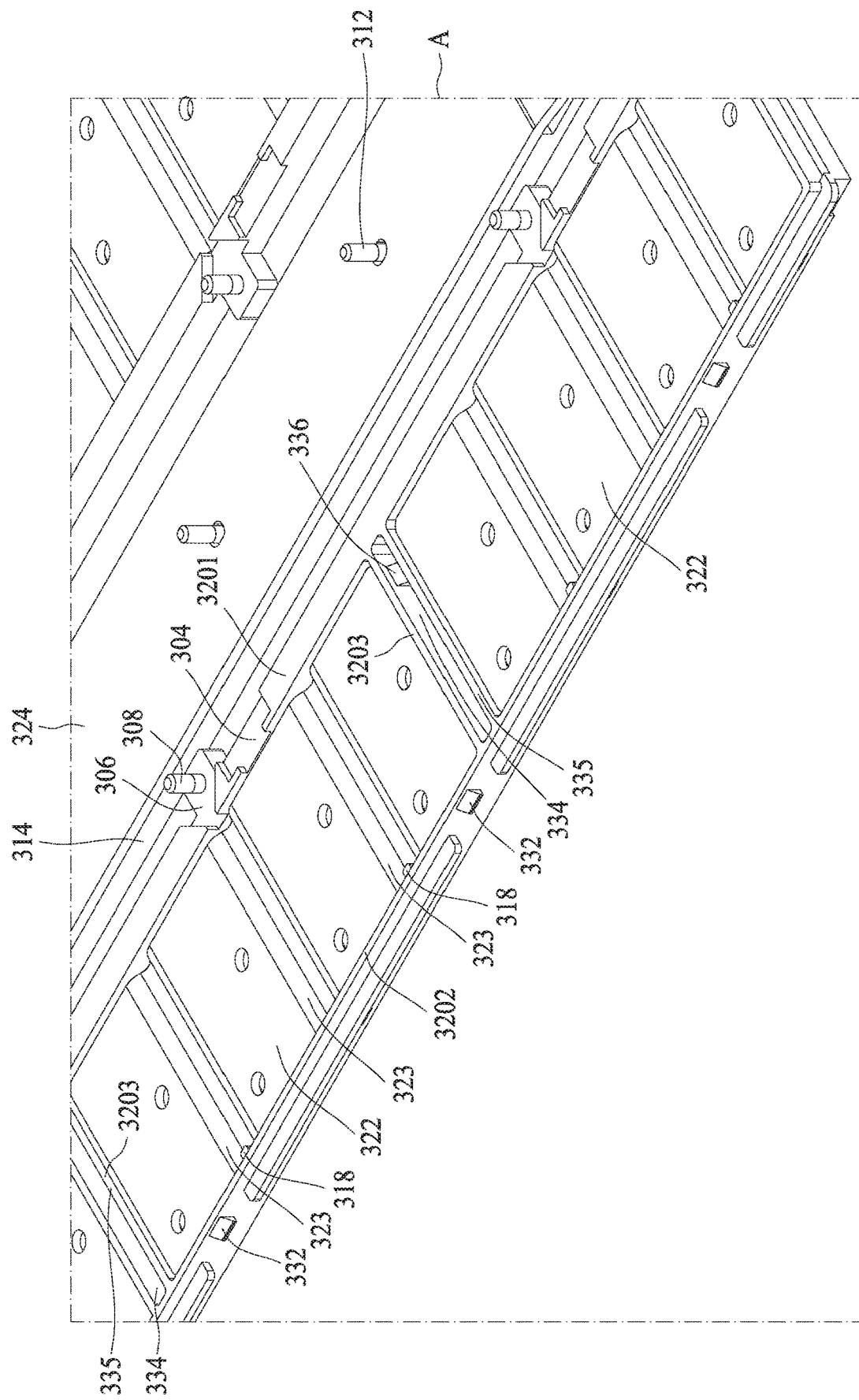
FIG. 3 is a perspective enlarged view of a partial region A of FIG. 2.
Figure 4:
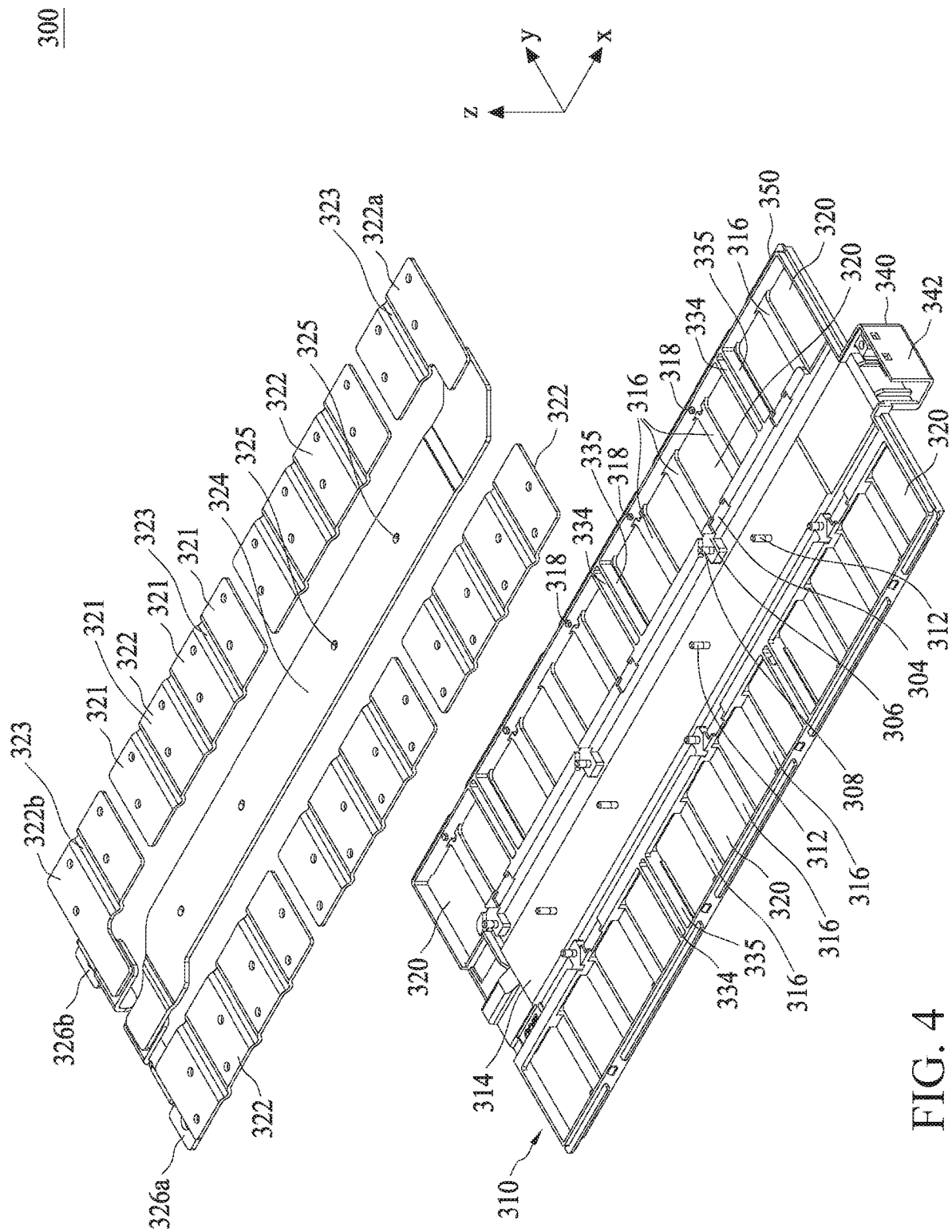
FIG. 4 is a perspective exploded view of the electrode connection tray of the embodiment of the present disclosure.

FIG. 2 is a perspective exploded view of the flexible circuit board 200 and the electrode connection tray 300 of the battery connection module 10 of the embodiment of the present disclosure. FIG. 3 is a perspective enlarged view of a partial region A of FIG. 2. FIG. 4 is a perspective exploded view of the electrode connection tray 300 of the embodiment of the present disclosure.

As shown in FIG. 4, the electrode connection tray 300 comprises a carrying tray 310 and a plurality of busbars 322. The plurality of busbars 322 are used to connect the batteries 902 in series, and includes two output busbars 322a, 322b respectively positioned at both ends of a series connection path and a plurality of serial connection busbars 322 positioned between the two output busbars 322a, 322b. The plurality of serial connection busbars 322 each have two or more electrode connecting portions 321, and one buffer bending portion 323 is positioned between every two adjacent electrode connecting portions 321 and bent downwardly, and the output busbars 322a, 322b each have one or more electrode connecting portions 321. In the embodiment, the serial connection busbars 322 each have four electrode connecting portions 321 and three buffer bending portions 323 each positioned between two adjacent electrode connecting portions 321, so that a combination of parallel connection and series connection is included among the four electrode connecting portions 321 of each of the serial connection busbars 322; the output busbars 322a, 322b each have two electrode connecting portions 321 and one buffer bending portion 323 positioned between the two electrode connecting portions 321, the output busbars 322a, 322b are used to connect an external circuit at both ends of the series connection path. In a varied embodiment, the serial connection busbars 322 may each have two electrode connecting portions 321, the output busbars 322a, 322b each have only one electrode connecting portion 321.

As shown in FIG. 4, the carrying tray 310 is a rectangular tray which has a length direction or longitudinal direction X, a width direction or transverse direction Y and an up-down direction Z perpendicular to a tray face. The carrying tray 310 has a frame 350 positioned at a periphery thereof, a middle mounting portion 314 extending in the longitudinal direction X and positioned in a middle of the carrying tray 310 in the transverse direction Y, a plurality of spacing bars 335 connecting the middle mounting portion 314 and the frame 350 in the transverse direction Y to form a plurality of busbar receiving grooves 320 positioned at both sides of the middle mounting portion 314 and used to mount the plurality of busbars 322. The flexible circuit board 200 is configured on the middle mounting portion 314 of the electrode connection tray 300 and the plurality of busbars 322 and the plurality of busbar receiving grooves 320 are arranged adjacent to both sides of the flexible circuit board 200. In combination with referring to FIG. 3, each busbar receiving groove 320 comprises an inner frame portion 3201 adjacent to the flexible circuit board 200 (the inner frame portion 3201 may be a part or extension of the middle mounting portion 314), an outer frame portion 3202 opposite to the inner frame portion 3201 (the outer frame portion 3202 may be a part of the frame 350) and two side frame portions 3203 respectively connecting both ends of the inner frame portion 3201 and the outer frame portion 3202 (each side frame portion 3203 may be a part of the spacing bar 335 or the frame 350), the inner frame portion 3201, the outer frame portion 3202 and the two side frame portions 3203 enclose to form a periphery of the busbar receiving groove 320. The inner frame portion 3201 of each busbar receiving groove 320 is adjacent to the flexible circuit board 200, and a bottom of each busbar receiving groove 320 comprises one or more bottom supporting bars 316 connecting a bottom of the inner frame portion 3201 and a bottom of the outer frame portion 3202, and one or more upper position-limiting protrusions 318 each positioned above the bottom supporting bar 316 are provided on an inner wall of the outer frame portion 3202.

Figure 5A:
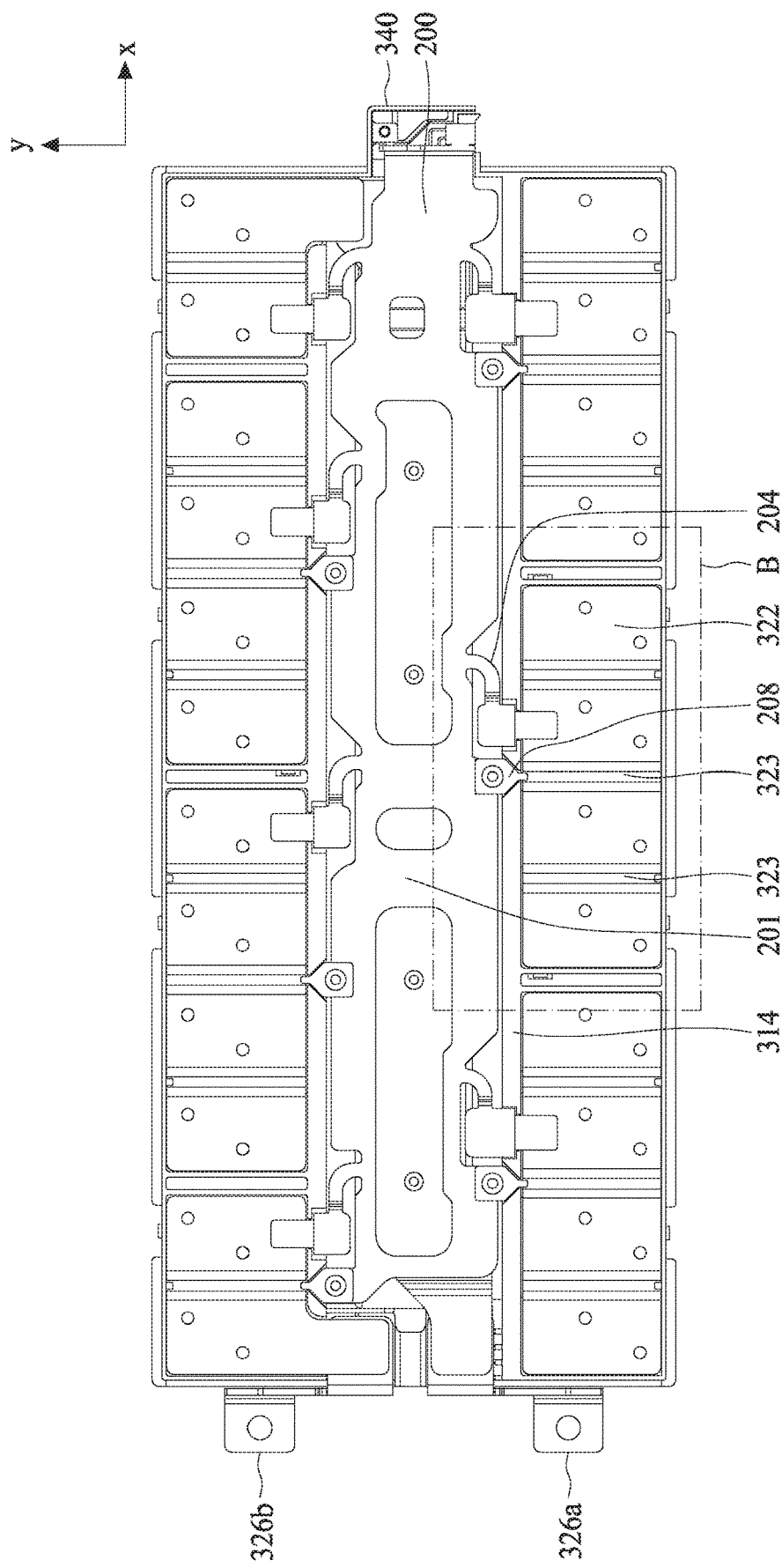
FIG. 5A is a top view after the electrode connection tray and the flexible circuit board of FIG. 2 are assembled.
Figure 5B:
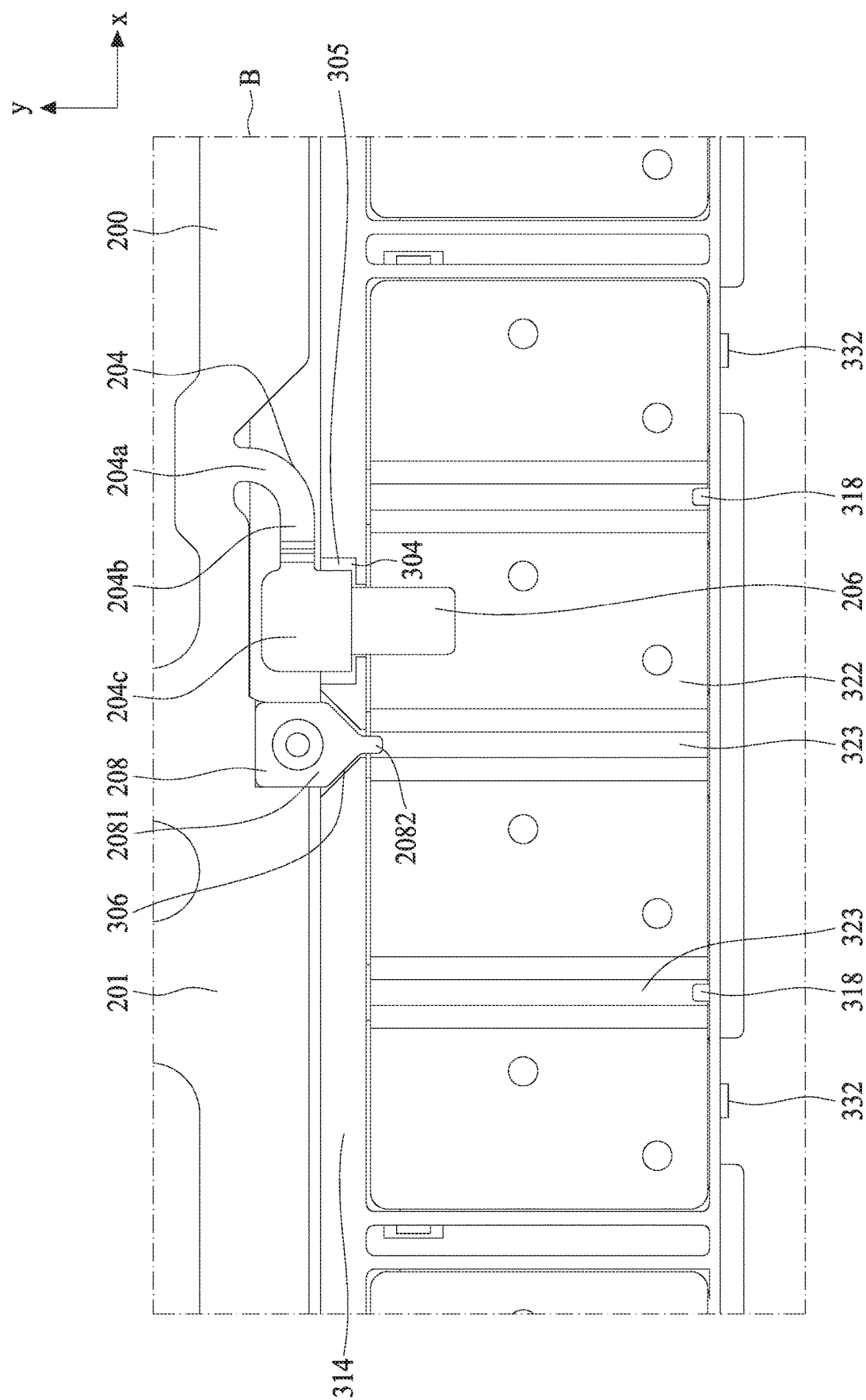
FIG. 5B is an enlarged view of a partial region B of FIG. 5A.

As shown in FIG. 2 through FIG. 4, the busbar receiving grooves 320 may be provided in the longitudinal direction X at both sides of the middle mounting portion 314. When the busbar 322 is provided in the busbar receiving groove 320, the busbar 322 can be inserted obliquely between the upper position-limiting protrusion(s) 318 and the bottom supporting bar(s) 316 to make each buffer bending portion 323 of the busbar 322 supported on each bottom supporting bar 316, and each upper position-limiting protrusion 318 is positioned above the corresponding buffer bending portion 323 of the busbar 322 (as shown in FIG. 5A and FIG. 5B), so that upwardly highest moving point of the busbar 322 can be limited at the outer frame portion 3202 side. After the busbars 322 are respectively provided in the busbar receiving grooves 320, referring to FIG. 1 again, battery electrodes (904a, 904b) of the batteries 902 can be respectively connected to the electrode connecting portions 321 of the busbars 322. Each busbar 322 can connect two or more batteries 902 in series or in series and parallel.

Figure 6:
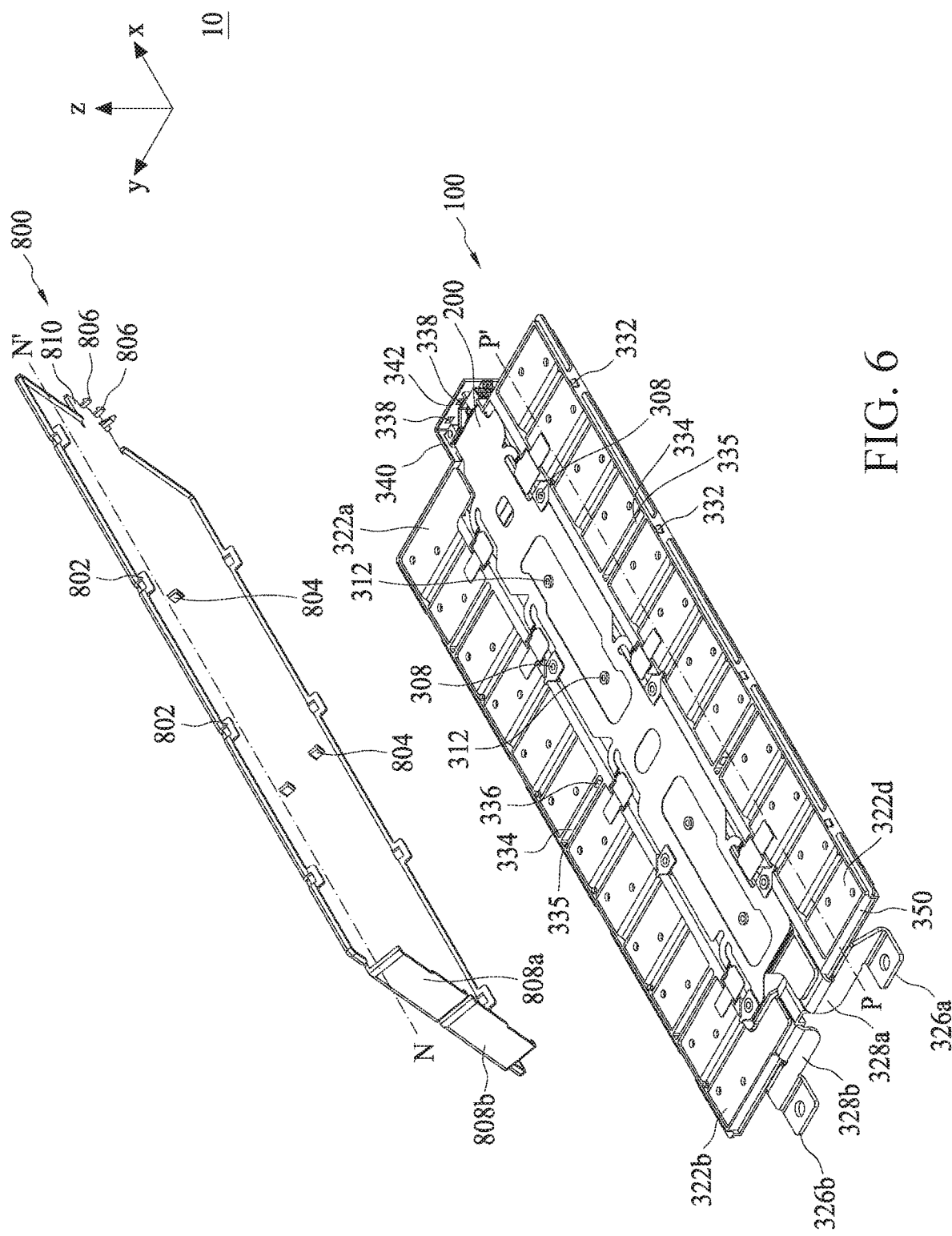
FIG. 6 is a perspective view before the assembled electrode connection tray and flexible circuit board are assembled with an upper cover of the embodiment of the present disclosure.

In another embodiment of the present disclosure, as shown in FIG. 2 to FIG. 4, the electrode connection tray 300 may further comprise an electrode adapter plate 324 and two electrode leading-out legs 326a, 326b, the electrode leading-out leg 326a is connected with the output busbar 322a via the electrode adapter plate 324, so as to make a power output position of the output busbar 322a converted to the electrode leading-out leg 326a. The electrode leading-out leg 326b is extension of the output busbar 322b, so that the two electrode leading-out legs 326a, 326b are positioned at the same side of the carrying tray 310. In addition, a plurality of retaining posts 312 are provided on the middle mounting portion 314 of the tray 310 and configured to pass through a plurality of through holes 325 on the electrode adapter plate 324 when the electrode adapter plate 324 is mounted. Referring to FIG. 6, the retaining post 312 can be hot-melted to have an enlarged head to fix the electrode adapter plate 324.

In an embodiment, the electrode connection tray 300 may not comprise the electrode adapter plate 324, therefore, holes corresponding to explosion-proof vents of the batteries can be provided on the middle mounting portion 314 of the carrying tray 310, so as to achieve the purpose of heat dissipation and explosion-proof. In an embodiment, the electrode connection tray 300 may not comprise the electrode adapter plate 324, the two electrode leading-out legs 326a, 326b can be respectively arranged on two opposite sides of the carrying tray 310.

Figure 8:
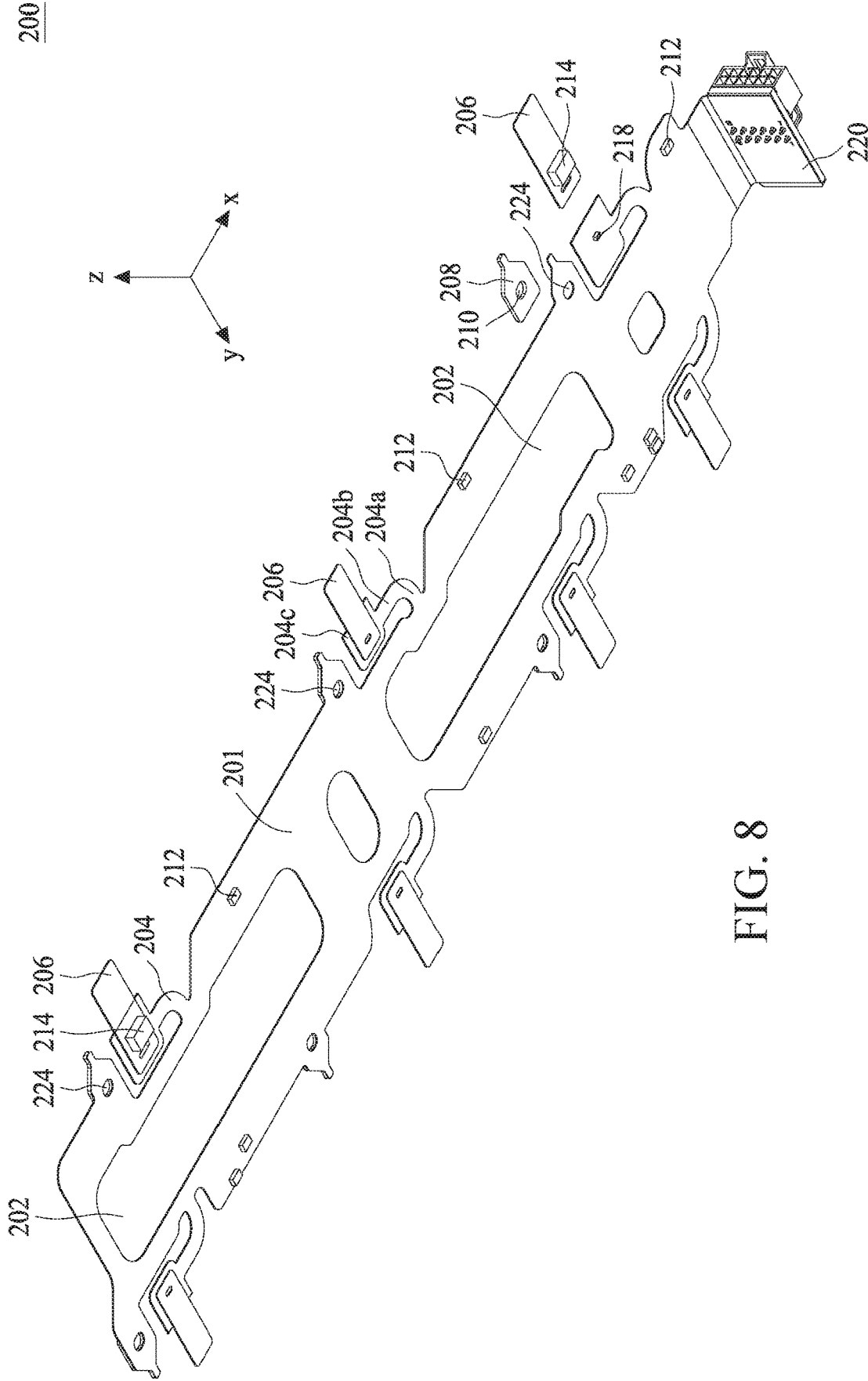
FIG. 8 is a perspective view of the flexible circuit board of the embodiment of the present disclosure.

Referring to FIG. 2 again, FIG. 2 is a perspective exploded view of the flexible circuit board 200 and the electrode connection tray 300 of the battery connection module 10 of the embodiment of the present disclosure. In combination with referring to FIG. 8, FIG. 8 is a perspective view of the flexible circuit board 200 of the embodiment of the present disclosure. The flexible circuit board 200 comprises a main body 201 and a plurality of L-shaped flexible arms 204 and a plurality of position-limiting plates 208 extending from sides of the main body 201. A distal end of each L-shaped flexible arm 204 is connected with a conductive plate 206, and each L-shaped flexible arm 204 is movably connected with the busbar 322 via the conductive plate 206. A hole 210 can be provided in a middle of the position-limiting plate 208, the flexible circuit board 200 may also have a fixing hole 224 (referring to FIG. 8), the fixing hole 224 of the flexible circuit board 200 can be overlapped with the hole 210 of the position-limiting plate 208, so that the flexible circuit board 200 and the position-limiting plate 208 can be penetrated together. The position-limiting plate 208 can be metal or nonmetal, and fixed on the flexible circuit board 200 by welding or adhering.

Referring to FIG. 3 again, FIG. 3 is a perspective enlarged view of a partial region A of FIG. 2. As shown in FIG. 3, a flexible arm receiving groove 304 can be provided on the inner frame portion 3201 of the busbar receiving groove 320 of the electrode connection tray 300 and configured to receive an end portion 204c of the L-shaped flexible arm 204, and a position-limiting plate receiving groove 306 can be provided on the inner frame portion 3201 of the busbar receiving groove 320 and configured to receive the position-limiting plate 208; the position-limiting plate 208 comprises a base portion 2081 received in the position-limiting plate receiving groove 306 and a protruding portion 2082, the hole 210 is provided on the base portion 2081 of the position-limiting plate 208; a position-limiting plate mounting post 308 can be provided in the position-limiting plate receiving groove 306 and configured to pass through the hole 210 in the middle of the position-limiting plate 208 to mount the position-limiting plate 208, and then the position-limiting plate mounting post 308 can be hot-melted to have an enlarged head (as shown in FIG. 6), so that the position-limiting plate 208 is fixed in the position-limiting plate receiving groove 306.

FIG. 5A is a top view after the electrode connection tray 300 and the flexible circuit board 200 of FIG. 2 are assembled. FIG. 5B is an enlarged view of a partial region B of FIG. 5A. As shown in FIG. 5A and FIG. 5B, when the position-limiting plate 208 is mounted in the position-limiting plate receiving groove 306, the base portion 2081 of the position-limiting plate 208 is received in the position-limiting plate receiving groove 306, and the protruding portion 2082 of the position-limiting plate 208 protrudes into the busbar receiving groove 320 and is positioned above the corresponding buffer bending portion 323 of the busbar 322, so that upwardly highest moving point of the busbar 322 is limited at the inner frame portion 3201 side close to the middle mounting portion 314. Because the side frame portion 3203 of the present disclosure is not provided with an upper position-limiting configuration for the busbar 322, the bottom supporting bars 316, the position-limiting plate 208 and the upper position-limiting protrusion(s) 318 toward the position-limiting plate 208 cooperate and can limit the busbar 322 in the busbar receiving groove 320 but have a space for displacement of the busbar 322 in a floating manner, which does not need complex structure. So it is simple and easy to mount the busbar 322 on the carrying tray 310.

As shown in FIGS. 5A and 5B, the flexible circuit board 200 comprises a main body 201 and a plurality of L-shaped flexible arms 204 respectively connected with the busbars 322. Each L-shaped flexible arm 204 comprises: a first section 204a extending outwardly from the main body 201 toward the busbar 322, the first section 204a can be generally perpendicular to the main body 201 and the busbar 322 (that is, the first section 204a extends outwardly in a direction generally along the transverse direction Y and perpendicular to the longitudinal direction X); a second section 204b connecting with the first section 204a and extending in a direction between the busbar 322 and the main body 201, the second section 204b can be generally parallel to the main body 201 and the busbar 322 (that is, the second section 204b extends in a direction generally parallel to the longitudinal direction X and perpendicular to the transverse direction Y); and an end portion 204c positioned at a distal end of the second section 204b and connecting with the conductive plate 206, and in turn connecting with the busbar 322 via the conductive plate 206. A space of the flexible arm receiving groove 304 shown in FIG. 3 is slightly larger than the end portion 204c as shown in FIG. 5B, so as to provide a clearance 305 for displacement of the end portion 204c when the end portion 204c is received.

In the embodiment as shown in FIG. 1 and FIG. 2, when the battery connection module 10 is assembled, the flexible circuit board 200 is assembled to the middle mounting portion 314 of the electrode connection tray 300 with a long side of the flexible circuit board 200 parallel to a long side of the electrode connection tray 300 (in the longitudinal direction X of FIG. 2). Alternatively, the flexible circuit board 200 may be not assembled to the middle of the electrode connection tray 300, but may be assembled at the both sides of the electrode connection tray 300. In addition, the flexible circuit board 200 comprises a connector 220, a connector receiving box 340 is correspondingly provided on a side of the electrode connection tray 300, and the connector 220 is inserted into the connector receiving box 340 provided on the side of the electrode connection tray 300. Referring to FIG. 2, the main body 201 of the flexible circuit board 200 is provided with two large hollow zones 202 which can allow the main body 201 to avoid the retaining post 312. In an embodiment, the electrode connection tray 300 may not comprise the electrode adapter plate 324, the hollow zone 202 of the flexible circuit board 200 can correspond to the holes provided on the middle mounting portion 314 of the carrying tray 310 for heat dissipation and gas discharging.

FIG. 6 is an exploded view of the battery connection module 10 of the present disclosure embodiment, in which the electrode connection tray 300 and the flexible circuit board 200 has been assembled together but an upper cover 800 has not been assembled therewith. When the upper cover 800 is assembled, the flexible arm receiving grooves 304 and the position-limiting plate receiving grooves 306 can be covered. As shown in FIG. 6, a periphery of the upper cover 800 is provided with a plurality of outer latching members 802, and an outer side of the frame 350 of the electrode connection tray 300 is provided with a plurality of outer latching blocks 332, the outer latching members 802 are configured to respectively latch with the outer latching blocks 332, so as to make the upper cover 800 cover the electrode connection tray 300. In an embodiment, the upper cover 800 further has a plurality of inner latching members 804, a channel 334 and an inner latching block 336 positioned in the channel 334 which correspond to each inner latching member 804 are provided in the spacing bar 335 of the electrode connection tray 300, the assembled structure of the upper cover 800 and the electrode connection tray 300 can be more stable by that each inner latching member 804 latches with each inner latching block 336.

In addition, the upper cover 800 has an extending portion 810 configured to cover the connector receiving box 340. The extending portion 810 also has a plurality of outer latching pieces 806 configured to respectively latch with a plurality of latching holes 338 on a side wall 342 of the connector receiving box 340. The two electrode leading-out legs 326a, 326b respectively have two vertical portions 328a, 328b, the upper cover 800 has two cover plates 808a, 808b and can respectively cover the two vertical portions 328a, 328b after the upper cover 800 is assembled to the electrode connection tray 300, so as to prevent people or things from touching the two vertical portions 328a, 328b and causing danger.

Figure 7A:
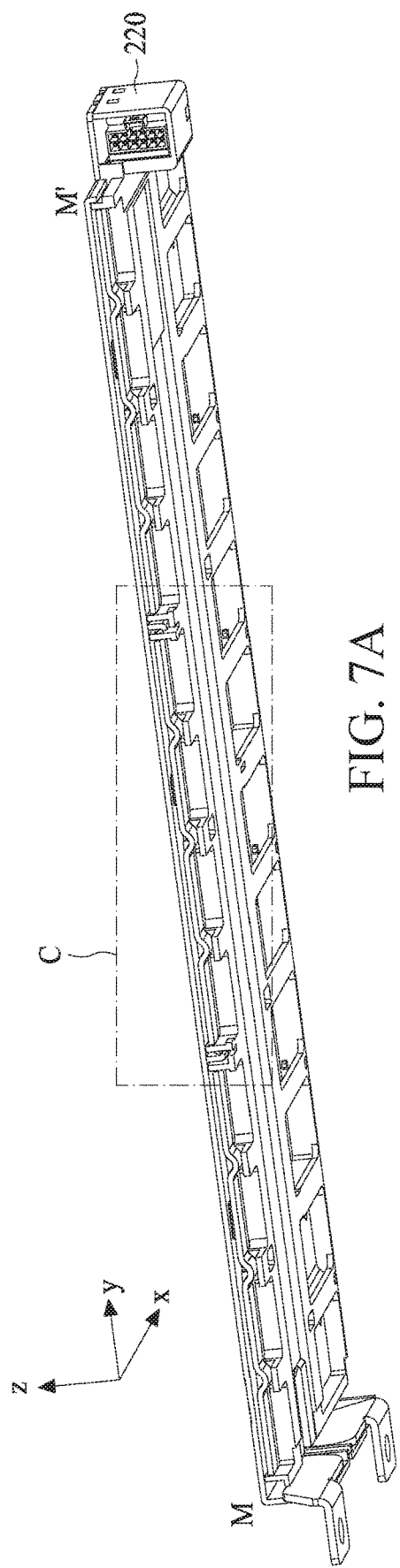
FIG. 7A is a perspective cross sectional view of a structure of the assembled electrode connection tray and upper cover of FIG. 6.
Figure 7B:
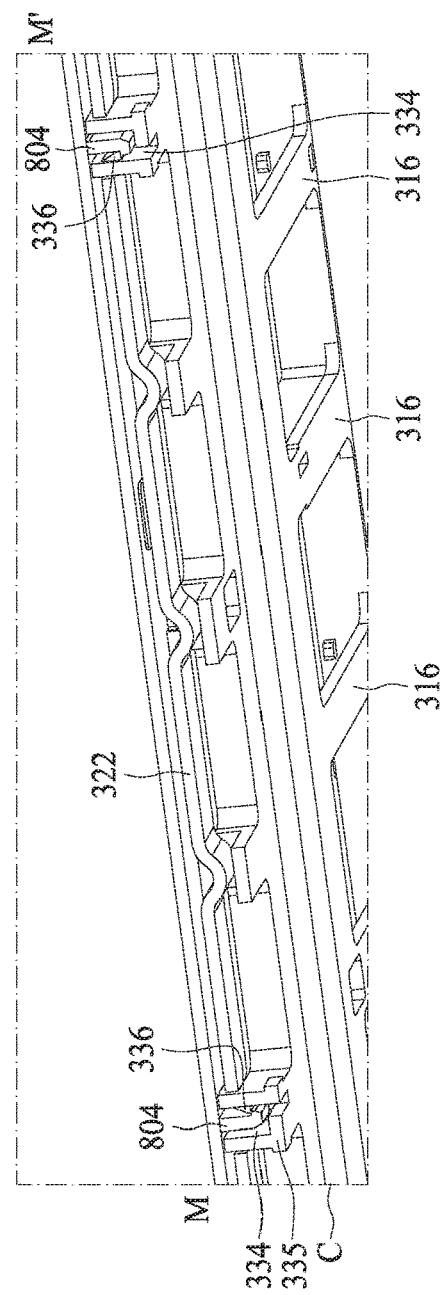
FIG. 7B is a perspective enlarged view of a region C of FIG. 7A.

FIG. 7A is a schematic view after the electrode connection tray 300 and upper cover 800 of FIG. 6 are assembled, in which a cross section line M-M' is a line formed after a line P-P' of the electrode connection tray 300 and a line N-N' of the upper cover 800 are overlapped after the battery connection module 10 and the upper cover 800 of FIG. 6 are assembled. FIG. 7B is an enlarged view showing the region C of FIG. 7A. The plurality of inner latching members 804 of the upper cover 800 respectively latch with the inner latching blocks 336 in the channels 334 of the electrode connection tray 300.

FIG. 8 is a perspective view of the flexible circuit board 200 of the embodiment in the present disclosure viewed from obliquely below the flexible circuit board 200. In addition, the connector 220 of the flexible circuit board 200 may be connected with a mating connector, so as to output a detected battery status signal to an external control device. Furthermore, the flexible circuit board 200 further comprises a fuse 212 and a sensor 214. Both ends of the fuse 212 are connected with a circuit (not shown in figures) on the flexible circuit board 200, the sensor 214 is provided on the conductive plate 206 and configured to detect voltage, current or temperature of the busbar 322. In an embodiment, the conductive plate 206 can be welded to the L-shaped flexible arm 204, and the sensor 214 can be connected with a circuit 218 of the L-shaped flexible arm 204.

When the battery under the busbar is displaced due to expansion, contraction or vibration, the existing strip-shaped flexible arm can only be deformed in the two-dimensional direction in response to the displacement of the busbar in the single direction. Relatively, the L-shaped flexible arm 204 of the present disclosure adopts a L-shaped design, which can be deformed directions respectively parallel to and perpendicular to the busbar 322, and cooperates with the clearance 305 in the flexible arm receiving grooves 304, the L-shaped flexible arm 204 of the present disclose can be deformed in the three dimensional direction in response to the displacement of the busbar 322; the L-shaped flexible arm 204 of the present disclosure is more able to ensure the mechanical and electrical connection between the flexible circuit board 200 and each busbar 322 and prevent the flexible circuit board 200 from being damaged.

Features of some embodiments are summarized in above content, so that a person skilled in the art may better understand various aspects of the disclosed content of the present disclosure. A person skilled in the art of the present disclosure shall understand that the disclosed content of the present disclosure may be easily used to design or modify other manufacturing approach or configuration and in turn to realize the same object and/or attain the same advantage as the embodiments of the present disclosure. A person skilled in the art of the present disclosure shall also understand that, such an equivalent approach or configuration cannot be departed from the spirit and scope of the disclosed content of the present disclosure, and a person skilled in the art may make various changes, substitutions and replacements, which are not departed from the spirit and scope of the disclosed content of the present disclosure.

What is claimed is:

1. A battery connection module, comprising:
a carrying tray having an inner frame portion, an outer frame portion, two side frame portions and a bottom supporting bar, the inner and outer frame portions extending in a longitudinal direction, the two side frame portions extending in a lateral direction which is perpendicular to the longitudinal direction, the outer frame portion being opposite to the inner frame portion, the two side frame portions respectively connecting both ends of the inner frame portion to the outer frame portion, the inner frame portion, the outer frame portion and the two side frame portions enclosing to define a periphery of a busbar receiving groove, the bottom supporting bar being provided to a bottom of the busbar receiving groove, the outer frame portion having a position-limiting protrusion provided to an inner wall thereof;
a busbar received within the busbar receiving groove, the busbar being supported by the bottom supporting bar, the position-limiting protrusion being positioned above the busbar in the up-down direction which is perpendicular to both the longitudinal direction and the lateral direction, the position-limiting protrusion limiting movement of the busbar in the up-down direction;
a flexible circuit board which is configured on the carrying tray, the inner frame portion being adjacent to the flexible circuit board, the flexible circuit board comprising a main body and a flexible arm, the main body extending in the longitudinal direction, the flexible arm extending into the busbar receiving groove and being movably operatively connected with the busbar; and
a position-limiting plate which is operatively connected to the main body of the flexible circuit board, the position-limiting plate extending into the busbar receiving groove and being positioned above the busbar in the up-down direction, the position-limiting plate limiting movement of the busbar in the up-down direction.

2. The battery connection module of claim 1, wherein the inner frame portion has a flexible arm receiving groove which receives a portion of the flexible arm.

3. The battery connection module of claim 1, wherein the flexible circuit board further comprises a conductive plate, wherein an end portion of the flexible arm is operatively connected with the busbar via the conductive plate.

4. The battery connection module of claim 1, wherein the two side frame portions of the busbar receiving groove are not provided with an upper position-limiting configuration for the busbar.

5. The battery connection module of claim 1, wherein the busbar has a buffer bending portion, the buffer bending portion being supported by the bottom supporting bar, the position-limiting protrusion being positioned above the buffer bending portion in the up-down direction.

6. The battery connection module of claim 1, wherein the busbar has a buffer bending portion, the buffer bending portion being supported by the bottom supporting bar, the position-limiting plate being positioned above the buffer bending portion in the up-down direction.

7. The battery connection module of claim 6, wherein the inner frame portion has a position-limiting plate receiving groove, the position-limiting plate receiving groove receiving the position-limiting plate.

8. The battery connection module of claim 7, wherein the position-limiting plate has a base portion and a protruding portion, the base portion being received in the position-limiting receiving groove, the protruding portion protruding into the busbar receiving groove and being positioned above the buffer bending portion in the up-down direction.

9. The battery connection module of claim 8, wherein the base portion has a hole therethrough, wherein a position-limiting plate mounting post is provided in the position-limiting plate receiving groove, and wherein the position-limiting plate mounting post passes through the hole to fix the position-limiting plate.

* * * * *